(12) United States Patent
DeLaPaz

(10) Patent No.: US 7,399,097 B1
(45) Date of Patent: Jul. 15, 2008

(54) MODULAR FILTERING AND REFLECTIVE SYSTEM FOR PHOTOGRAPHIC USE

(76) Inventor: Xavier DeLaPaz, 1716 Lake Shore Dr., Ft. Worth, TX (US) 76103

( * ) Notice: Subject to any disclaimer, the term of this patent is extended or adjusted under 35 U.S.C. 154(b) by 31 days.

(21) Appl. No.: 11/157,555

(22) Filed: Jun. 21, 2005

Related U.S. Application Data

(60) Provisional application No. 60/616,074, filed on Oct. 5, 2004.

(51) Int. Cl.
  *G03B 15/02* (2006.01)
(52) U.S. Cl. ............................ 362/18; 362/17; 362/279; 362/320; 362/354; 362/355
(58) Field of Classification Search ............... 362/3, 362/16–18
  See application file for complete search history.

(56) References Cited

U.S. PATENT DOCUMENTS

| | | | |
|---|---|---|---|
| 2,193,485 A * | 3/1940 | Kenning .................... 362/283 |
| 2,356,694 A | 8/1944 | Potter et al. |
| 2,586,583 A * | 2/1952 | Wagner .................... 362/346 |
| 2,714,153 A * | 7/1955 | Talbot .................... 362/353 |
| 3,939,340 A | 2/1976 | Gozzano et al. |
| 4,052,607 A | 10/1977 | Larson |
| 4,075,472 A | 2/1978 | Higuchi |
| 4,146,918 A | 3/1979 | Tureck |
| 4,428,030 A | 1/1984 | Baliozian |
| 4,446,506 A | 5/1984 | Larson |
| 4,460,946 A | 7/1984 | Tinz |
| 4,490,776 A | 12/1984 | Kluch |
| 4,504,888 A | 3/1985 | Rosenthal |
| 4,524,405 A * | 6/1985 | Heard .................... 362/18 |
| 4,594,645 A | 6/1986 | Terashita |
| 4,633,374 A | 12/1986 | Waltz et al. |
| 4,669,031 A | 5/1987 | Regester |
| 4,757,425 A | 7/1988 | Waltz |

(Continued)

OTHER PUBLICATIONS http://www.bogenimaging.us/products/templates/templates.php3?sectionid=201&itemid=507 p. 1, printed Jun. 21, 2005.

(Continued)

*Primary Examiner*—Sandra O'Shea
*Assistant Examiner*—Jason Moon Han
(74) *Attorney, Agent, or Firm*—Baker Botts L.L.P.

(57) ABSTRACT

A modular filtering and reflective system for photographic use is herein disclosed which provides for the precise modification of virtually any type of light pattern. The system is particularly adapted for use with conventional soft boxes, or a bendable panel frame that is disclosed herein. The filtering system is comprised of a plurality of bendable panels of varying opacity and reflective or refractive color tones which are contiguously interconnectable in order to form a panel which is adapted for placement proximate the front opening of the soft box. Each bendable panel also includes a circumferentially disposed edge stiffener for retention of the shape thereof, yet sufficiently pliable to allow selective bending to any user desired shape. The bendable panels may be used as stand-alone hand held, or free standing devices and may also find utility as photographic flags, dots, or fingers. The modular filtering system provides an inexpensive, easily portable, and easy to use means for deriving enhanced versatility from a conventional photographic soft box, or virtually any type of photographic lighting system.

12 Claims, 8 Drawing Sheets

U.S. PATENT DOCUMENTS

| | | | |
|---|---|---|---|
| 4,760,498 A | 7/1988 | Lang et al. | |
| 5,023,756 A | 6/1991 | Regester | |
| 5,493,481 A | 2/1996 | Wiegrand | |
| 5,758,196 A | 5/1998 | Lahng | |
| 6,010,234 A | 1/2000 | Rahn | |
| 6,076,935 A | 6/2000 | Kester | |
| 6,168,291 B1 | 1/2001 | Rockey et al. | |
| 6,176,598 B1 | 1/2001 | Seligman | |
| 6,280,055 B1 | 8/2001 | Merko | |
| 6,322,235 B1 | 11/2001 | Strobel | |
| 6,411,778 B1 | 6/2002 | Peterson | |
| 6,519,089 B2 | 2/2003 | Graham | |
| 6,709,121 B1 | 3/2004 | Lowe et al. | |
| 6,733,145 B2 | 5/2004 | Shirilla | |
| 6,892,743 B2 | 5/2005 | Armstrong et al. | |
| 7,054,549 B2 * | 5/2006 | Hiesinger | 396/3 |
| 7,063,428 B2 * | 6/2006 | Lowe | 362/18 |
| 2002/0075666 A1 * | 6/2002 | Shirilla et al. | 362/16 |
| 2002/0191295 A1 | 12/2002 | Hagenbach et al. | |
| 2006/0007666 A1 * | 1/2006 | Cook | 362/16 |

OTHER PUBLICATIONS http://www.bogenimaging.us/products/templates/templates.php3?sectionid=202&itemid=511 pp. 1-2, printed Jun. 21, 2005.
http://www.bogenimaging.us/products/templates/templates.php3?sectionid=204&itemid=508 p. 1, printed Jun. 21, 2005.

* cited by examiner

MODULAR FILTERING AND REFLECTIVE SYSTEM FOR PHOTOGRAPHIC USE

BACKGROUND TO RELATED APPLICATIONS

This application claims priority under 35 U.S.C. 119(e) to U.S. Provisional application No. 60/616,074, entitled MODULAR FILTERING AND REFLECTIVE SYSTEM FOR PHOTOGRAPHIC USE, which was filed on Oct. 5, 2004 by Xavier DeLaPaz.

FIELD OF THE INVENTION

The present system relates to photographic filtering and reflective devices, and more particularly, to a modular filtering and light pattern modification system for photographic purposes that is inexpensive, easy to use, and easily transportable.

BACKGROUND OF THE INVENTION

Photographic soft boxes, also commonly referred to as "light diffusion boxes", have found widespread usage in the photographic industry due to their light weight, easy portability, as well as ease of use. The conventional soft box typically comprises a reflective, flexible material member which is adapted to be stretchingly extended into a somewhat parabolically shaped structure via a plurality of flexible struts or rods. The struts are removably or pivotably attached at one end to a light source receptacle, thereby defining the rear portion thereof, and extend forward to a front opening. A light source which is enveloped within the parabolically shaped structure is secured proximate the focal point thereof via the receptacle. Thus, when the light source is energized, the structure acts to direct the resulting light forward through the front opening and onto the subject to be illuminated.

Although the soft box was hereinabove described as a photographic soft box, the soft box may also be used with video or moving picture recordation equipment. Therefore, throughout this document, it is to be understood that references to photographic type lighting equipment will also be applicable to video type lighting equipment.

Although the conventional soft box has provided an adequate means to artificially illuminate a photographic subject, the ability to independently modify specific regions of the resulting light pattern using relatively compact, and inexpensive components has heretofore remained largely unexplored. For example, U.S. Pat. No. 4,052,607 to Larson describes the use of a multi-louvered mechanism as well as a "barn door" type apparatus in order to deflect particular regions of the soft box's light pattern. However, both of these proposed devices require the use of rigid materials secured upon hinges thereby forming a relatively heavy, unwieldy structure which does not lend itself to easy portability. Furthermore, the use of either design does not provide for color filtering of specific regions of the soft box's light pattern. For instance, in many cases it is desirous to add warmer, cooler, or other types of color tones to particular regions of the photographic subject, wherein warming temperature colors are defined as light predominantly in the red region of the visible light scale and cooling temperature colors are defined as light predominantly in the blue region of the visible light scale. Moreover, although U.S. Pat. No. 5,023,756 to Regester does describe the use of a graduated filtering mechanism for equalizing the umbra and penumbra of the resulting light pattern of a conventional soft box, no means are provided to allow selective modification of specific regions of the resulting light pattern thereof.

Thus, there has remained a long-felt, unsatisfied need to incorporate means to easily modify specific portions of the light pattern of a photographic light source and in particular, a conventional soft box. A solution to this need should complement the lightweight, portable, and inexpensive design of the conventional soft box and provide ease of use for virtually any user.

SUMMARY OF THE INVENTION AND OBJECTIVES

The present invention provides a solution to these needs as well as other needs via a system which provides for the selective filtering and reflecting of specific regions of the resulting light pattern of various types of photographic lighting devices such as conventional photographic soft boxes. The novel design provides not only attenuation and reflection of specific regions of virtually any light pattern, but also enables color filtering of these specific regions using softening, warming, cooling, diffusing, or other types of filtering membranes. The system generally comprises a plurality of selectively bendable panels which are adapted for selective inter-connection along the outer edges thereof in order to form a contiguous block of virtually any shape for placement proximate the front opening of a conventional soft box, for releasable attachment to an elongated pole in order to form a flag, or as stand-alone devices. The user constructed block of panels may be configured to cover the front opening of the soft box or may be configured to mimic conventional "barn doors" wherein one edge thereof is removably attached to the front opening thereof. Optionally, the bendable panels may be configured as stand-alone devices which are hand-held, or supported upon any generally flat surface.

Also included with the system is a releasably attachable, manually shapeable tape which enables selective positioning of the bendable panels to any user defined orientation. The manually shapeable tape generally comprises two substantially elongated sections of complementary hook-and-loop fastening material having a substantially elongated section of edge stiffener material sandwiched therebetween.

Each modular panel possesses either an opaque surface for reflection of light from the surface thereof, or a translucent surface for partial transmission of light therethrough. Further, each modular panel configured with an opaque surface may comprise varying color hues such as gold or silver to create either a warming or cooling color temperature effect respectively. For example, if warmer color tones for a particular region of the emanating light pattern is desired, an opaque panel having a gold colored surface may be configured into the block of panels. Conversely, if cooler, brighter color tones for a specific region of the light pattern is desired, an opaque panel having a silver surface may be configured thereinto. Additionally, the resulting light pattern may be further modified using panels having a translucent surface which are adapted for placement proximate any photographic light source, including a conventional soft box. Thus, panels having varying reflectivity or filtering means may be mixed or matched in virtually any combination in order to create a resulting light pattern which is highly tailored to suit the user's needs.

Each of the panels provides for further modification of the resulting light pattern via implementation of an optional panel shaping means which provides for selective bending thereof to any user defined shape. Preferably, this bending feature is enabled by a panel frame which is formed from bendable metal strips which extend around the outer periphery of each of the panels. The metal strips are sufficiently rigid to hold the panel in its user selected shape, yet sufficiently flexible to allow easy bending by a user without excessive effort.

In addition to usage of the modular panels proximate the front opening of a conventional soft box, the modular panels may also be adapted for usage as photographic flags. A conventional photographic flag is defined by a generally rectangular-shaped sheet of opaque or translucent flexible material having a frame which stretchingly supports the sheet from at least three edges thereof. Although the conventional photographic flag has served its purpose well, the interchangeability of sheets on the supporting frame, which have differing filtering or reflective characteristics, has continued to be a burdensome task. The present invention provides a solution to this problem by providing a plurality of modular panels which are releasably attachable to a pole having hook-and-loop fastening means fashioned thereon. Thus, an enhanced photographic flag system may be realized in which the flexible material may be easily changed or a plurality of panels may be contiguously adjoined to create a larger photographic flag. Moreover, if a plurality of panels are used, each of the panels may differ in the type of flexible material in order to more fully tailor the resultant light reflected or transmitted through the panel.

It is therefore an object of the present invention to provide a system which enables the selective filtering, attenuating, reflecting, or blocking of specific regions of the resulting light pattern of virtually any photographic light source.

A further object of the present invention is to provide a system which enables the selective filtering, attenuating, reflecting, or blocking of specific regions of the resulting light pattern of a conventional soft box.

A further object of the present invention is to provide a regionally selective filtering system for a conventional soft box which is modular in design thereby creating a myriad of possible light pattern modifications available to the user.

Another further object of the present invention is to provide a modular light filtering system that is releasably attachable to an elongated pole in order to form a photographic flag.

Another further object of the present invention is to provide a regionally selective filtering system for a conventional soft box having a bendable frame structure to further enhance the possible modifications to the light pattern of a conventional soft box.

Another object of the present invention is to provide a substantially elongated section of hook-and-loop fastening material having a bendable frame structure incorporated thereinto for the placement of virtually any object, which has hook-and-loop fastening material attached thereon, in any user selectable position.

Another object of the present invention is to provide a regionally selective filtering system for a photographic light source including a conventional soft box which is compact and portable in design, thus facilitating usage thereof at virtually any location.

Another object of the present invention is to provide a regionally selective filtering system for a photographic light source including a conventional soft box which is inexpensive to produce and therefore, inexpensive for the end user.

These and other objects of the present invention will become readily apparent to those familiar with the construction and use of photographic light sources including light diffusion boxes or soft boxes and will become apparent in the following portions of the specification, wherein the detailed description is for the purpose of fully disclosing preferred embodiments of the invention without placing limitations thereon.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF THE PREFERRED EMBODIMENT

Figure 1:
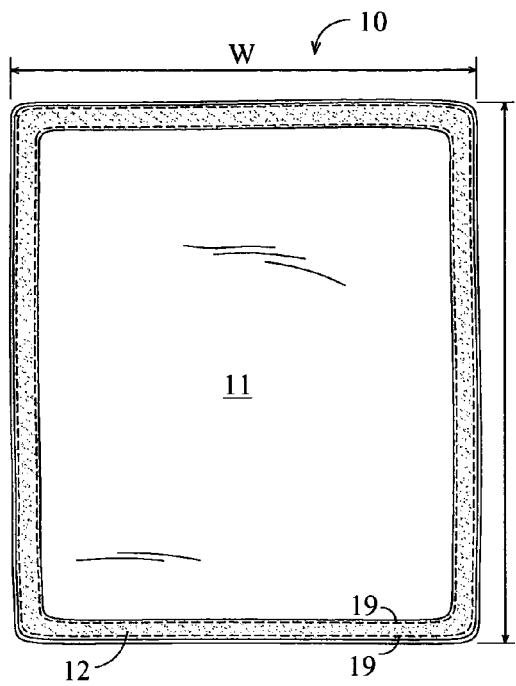
FIG. 1 is a front elevational view of a preferred embodiment according to the present invention.

Referring now to the drawings, a bendable panel of a modular filtering system for a conventional photographic soft box is designated by the reference numeral 10. The bendable panel 10 comprises a generally rectangular sheet of flexible material 11 having fasteners (12 and 13) attached proximate the outer periphery of the front and rear surfaces thereof respectively, with a metal stiffener member 14 sandwiched therebetween. The fasteners (12 and 13) provide for the selective interconnection of multiple bendable panels 10 along the outer perimeter thereof in order to form a contiguous panel for placement proximate the front opening 15 of a conventional soft box 16 or for general use as a light reflector. As best shown in FIGS. 6 through 10, the bendable panel 10 of the present embodiment as shown is generally rectangular in shape in order to form a system which closely conforms to the shape of the front opening of a conventional soft box which is also rectangular in shape; however, it is to be appreciated that the bendable panel 10 may also be embodied in other geometric shapes such as triangles, hexagons, or even trapezoids in order to conform to the front opening of other soft boxes having non-rectangular geometric shapes. Furthermore, the bendable panel may be embodied in other shapes such as circles, or ovals if a plurality of panels having contiguously alignable edges is not needed or desire.

Figure 2:
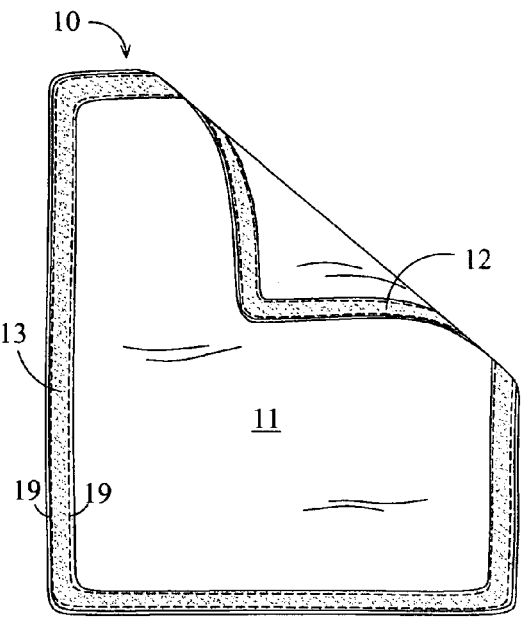
FIG. 2 is a rear elevational view of the embodiment of FIG. 1 shown with an upper corner bent downwards to reveal a portion of the front surface thereof.
Figure 3:
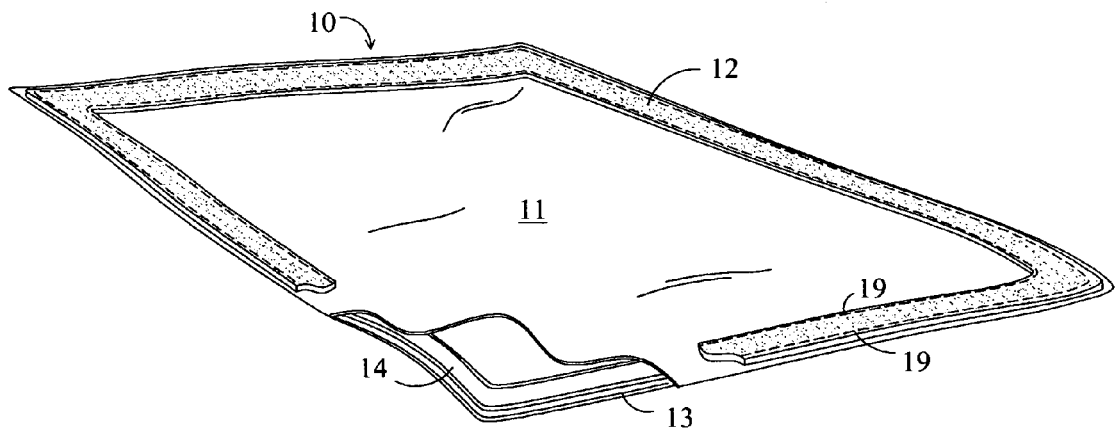
FIG. 3 is a perspective view of the embodiment of FIG. 1 shown with a portion of the fastener and flexible material cut away to reveal the arrangement of layers thereof.

Although the releasable attachment means may be comprised of any known self-adhering mechanism including snaps, clips, pressure-sensitive adhesive, latches, and the like, the preferred attachment mechanism of the present embodiment utilizes VELCRO™ hook-and-loop fastening material. The hook-and-loop fastening material is characterized by a pair of complimentary elongated sections of flexible material, wherein one section 12 is affixedly attached to the front surface of the flexible material 11 and the other section fastener is afixedly attached to the rear surface thereof, as shown in FIGS. 1 through 3. Although securement of the fasteners (12 and 13) to the flexible material 11 is accomplished preferably by the stitchings 19, it is to be understood that other securement means may be employed such as adhesives, weldment, or the like. Thus, the hook-and-loop material provides for the selective attachment of the edge portion of any bendable panel 10 to the edge portion of another bendable panel. In this manner, multiple bendable panels may be combined contiguously in order to form a larger panel for placement around the front opening of the soft box or other photographic device. Releasable attachment means 18, preferably hook-and-loop fastening material secured to the inner perimeter of the front opening of the conventional soft box is provided to enable releasable securement of the bendable panels 10 thereto.

An elongated, flexible metal strip 14, preferably made of aluminum, defining an edge stiffener is included which provides for the selective bending or warping of the bendable panel 10 to suit the user's need. The metal strip 14 extends around the entire periphery of the sheet of material 11 and is entrapped between the rear surface thereof and section 13 via the stitchings 19 as best shown in FIG. 3. Although the present embodiment describes a metal strip which is formed of an elongated fastener of bendable aluminum having a width of approximately 0.5 inches and a thickness of approximately 40 mils, the edge stiffener may also be a flexible wire such as 14 gauge, THNN wire or any other suitable material which will retain its shape, yet is sufficiently pliable to be bent or formed by a user without excessive effort.

The flexible, light modifying sheet of flexible material 11 may be formed of any lightweight, flexible material or fabric having an opacity that is opaque or translucent such as mylar, DACRON™, woven or non-woven fabrics, or other similarly suitable material. Additionally, it is contemplated that the light modifying sheet may also include a sheet of aluminum having a thickness that is sufficiently rigid in order to maintain its shape, yet sufficiently pliable in order to be easily bent into any shape by a user, wherein an example of such a material is available from Rosco Laboratories, Inc. of Stamford, Conn. under the tradename CINEFOIL™ or PHOTOFOIL™. One utilitarian aspect of the present invention that is afforded via the selectively rigid property of CINEFOIL™ or PHOTOFOIL™ is the ability to abate the necessity for edge stiffeners around the periphery thereof. Nevertheless, flexible materials having a relatively high opacity may be used within the system of the present invention to entirely block specific regions of the soft box's natural light pattern. Opaque materials having a surface that is at least partially reflective may also be used to reflect specific portions of the emanating light pattern. Conversely, materials having a medium or translucent opacity may be used to attenuate or color adjust specific regions of the soft box's natural light pattern. Examples of translucent materials which are within the scope of the present invention include scrims, which are adapted to soften the emanating light pattern, and color filters, which are adapted to warm or cool the color temperature of the emanating light pattern. Thus, multiple bendable panels incorporating differing types of flexible materials 11, each having varying opacities, and reflective surfaces configured thereon may be used in conjunction in order to form a system which is adapted to precisely tailor the light pattern from a conventional soft box or to provide a generic light reflecting panel for virtually any light source.

Bendable panels 10 formed of substantially opaque flexible material may have one surface thereof coated with a reflective or partially reflective layer in order to 'bounce' the emanating light from one specific region of the natural light pattern of a light source such as a conventional soft box to another region. These reflective layers may be silver in color in order to maximally reflect all available light, gold in color to create a warming color tone to the reflected light, black in color to cause minimal reflectivity of incident light, or even white, a color which diffuses the reflected light evenly over the visible spectrum. Materials 11 having a reflective surface are formed by providing a lightweight fabric, preferably DACRON™ that is substantially black in color, and painting a layer on at least one surface thereof using any commonly accepted painting technique. After the reflective paint layer has dried, a sheen is imparted to the reflective surface via application of a lamination layer over the reflective paint layer.

Figure 4:
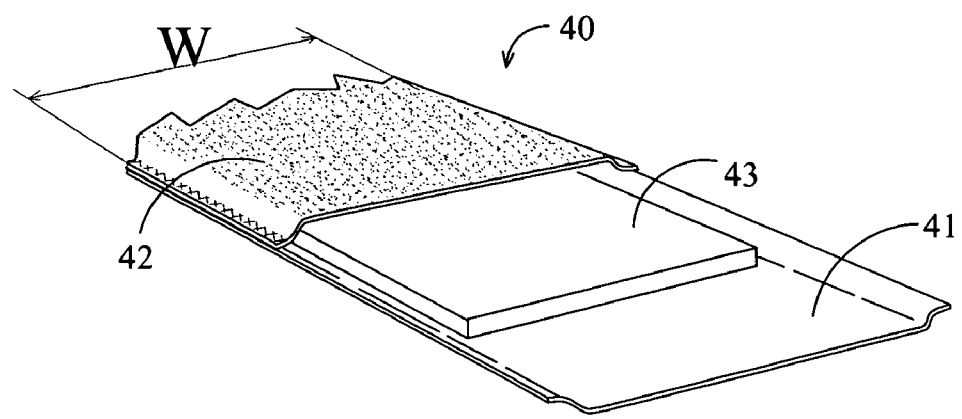
FIG. 4 is an enlarged, partial perspective view of a releasably attachable, manually shapeable tape of the present invention shown with a portion of the upper section of hook-and-loop fastening material and edge stiffener partially cut away to reveal the arrangement of layers thereof.
Figure 5:
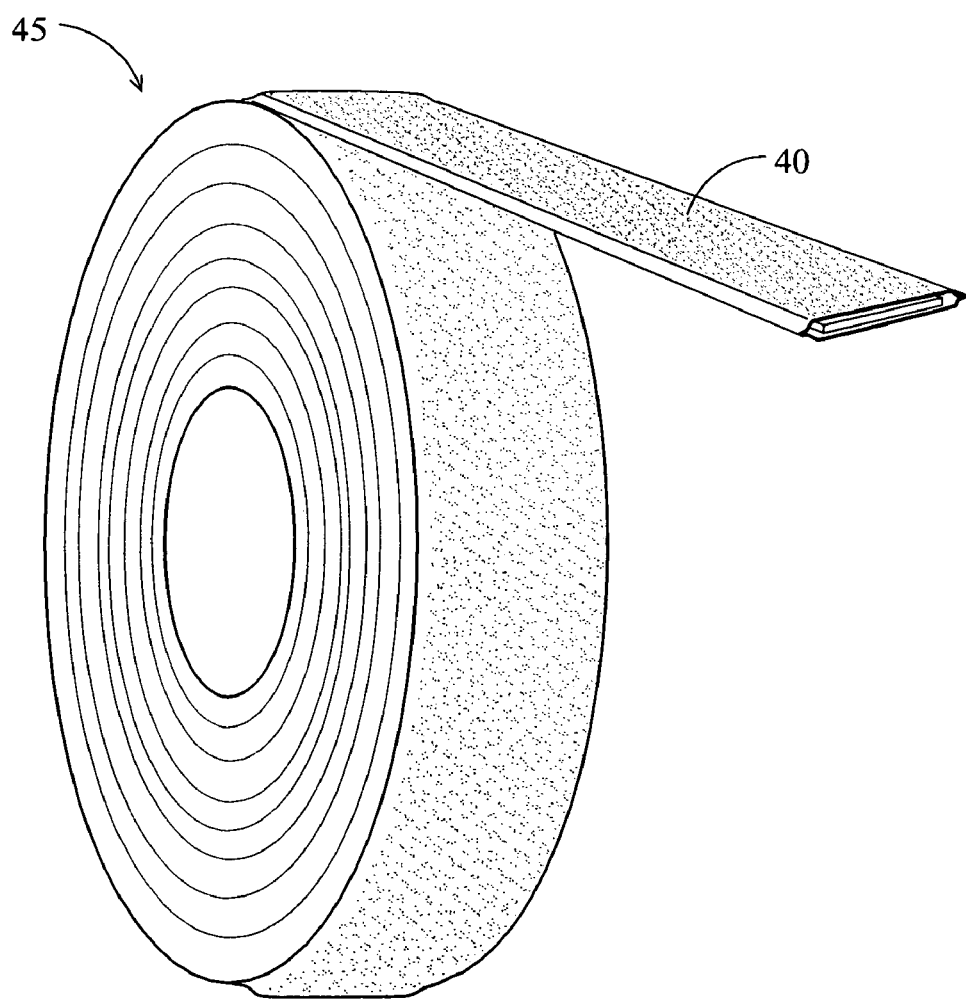
FIG. 5 is a perspective view of the releasably attachable, manually shapeable tape of FIG. 4 shown in the form of a roll.

An optional component of the modular filtering and reflective system of the present invention contemplates a releasably attachable, manually shapeable tape 40 comprising at least one, and preferably two substantially elongated, and complementary sections of hook-and-loop fastening material having an edge stiffener 43 sandwiched therebetween as shown in FIGS. 4, and 5. The substantially elongated section of manually shapeable tape is severable by a user into a plurality of relatively shorter sections in order to form a prop or support structure for the bendable panels 10. The tape 40 is formed via a lower section 41 of hook-and-loop fastening material that is affixedly attached to an upper section 42 of hook-and-loop fastening material using any commonly known securement means such as stitching, weldment, or the like. The upper section 42 of hook-and-loop fastening material is preferably complementary to the lower section 41 of hook-and-loop fastening material such that the upper section of one piece of tape may be releasable attached to the lower section of another piece of tape. Sandwiched in between the upper 42 and lower 41 section is an elongated section of edge stiffener 43 having the characteristics as described hereinabove. The substantially elongated section of manually shapeable tape 40 may be provided in a roll 45 as best shown in FIG. 5. The width W of the tape 40 is preferably less than 6 inches, and most preferably between the range of 0.8 to 2 inches across, however it is contemplated that any width may be realized which is not unduly large. Although the present embodiment describes the implementation of a manually shapeable tape formed into two complementary sections, it is to be understood that a manually shapeable tape may also be formed using only one section of hook-and-loop fastening material wherein the edge stiffener may be secured thereto using any suitable adhesive. Additionally, the manually shapeable tape 40 is not limited for use only with the modular filtering system, wherein those skilled in the art will readily recognize that a myriad of objects, possessing complementary hook-and-loop fastening means, may be placeable at virtually any position and/or orientation using the teachings of the present embodiment.

Figure 6:
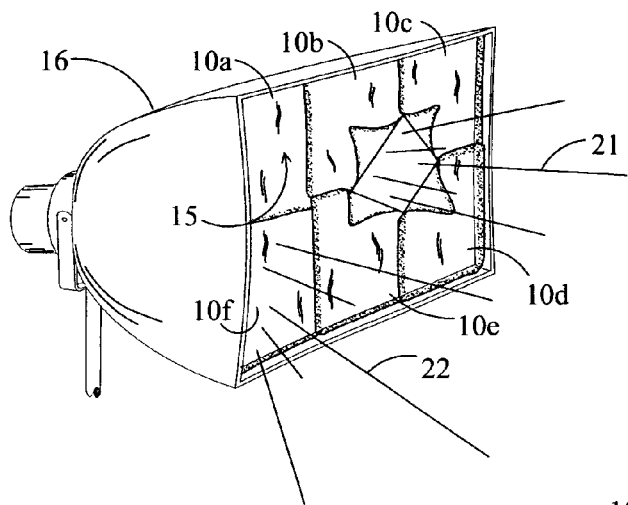
FIG. 6 is a perspective view of a plurality of the bendable panels of FIG. 1 shown in operational engagement over the front opening of a conventional photographic soft box, wherein the plurality of panels are optimally sized to form a two-by-three configuration.
Figure 7:
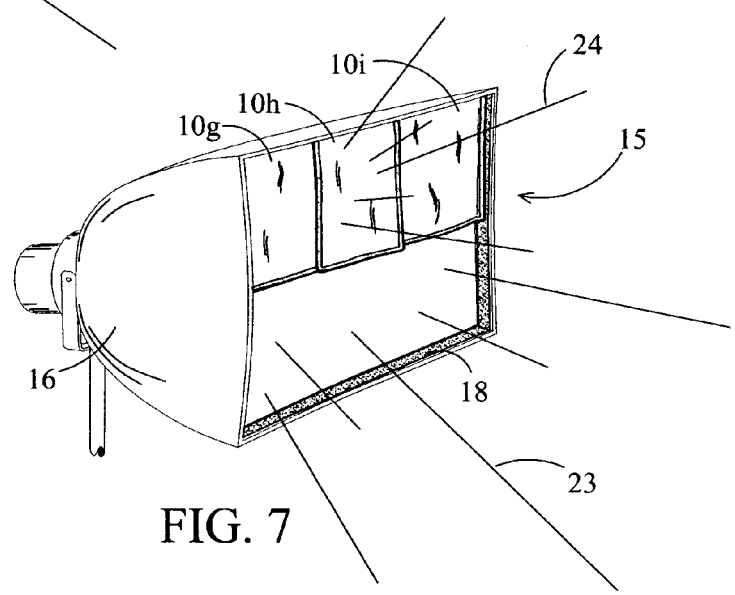
FIG. 7 is another perspective view of a plurality of the bendable panels of FIG. 1 shown in operational engagement over the front opening of the conventional photographic soft box of FIG. 6.
Figure 8:
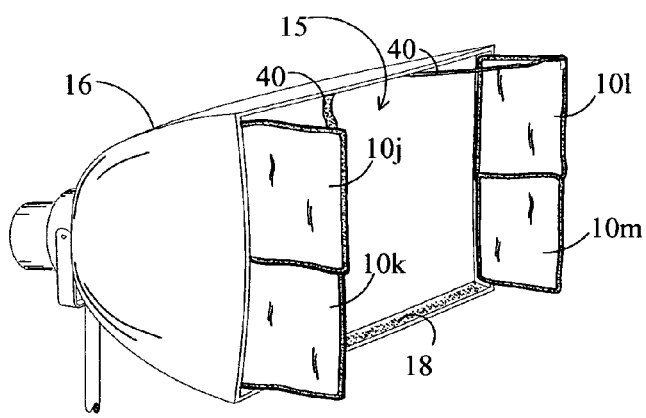
FIG. 8 is another perspective view of a plurality of the bendable panels of FIG. 1 shown in operational engagement on the front opening of a conventional photographic soft box, wherein the plurality of bendable panels mimic conventional photographic "barn doors".

Several examples of the myriad of possible combinations of bendable panels 10 are shown in FIGS. 6 through 13. One preferred embodiment describes the use of bendable panels 10 having a predetermined height H and width W defining the size thereof which provides for total coverage of the front opening 15 of a conventional soft box by the contiguous placement thereof in two rows of three columns, thereby forming a two-by-three modular configuration, as shown in FIGS. 6 through 8. Nevertheless, it is to be understood that each of the bendable panels 10 may have substantially any predetermined size, preferably each bendable panel has a predetermined size which provides for contiguous placement such that an integral quantity of bendable panels may completely cover the front opening of a soft box via any modular configuration including one-by-two, two-by-two, two-by-four, and the like.

As shown in FIG. 6, a plurality of bendable panels 10 are contiguously interconnected in order to form a panel which encloses the front opening 15 of a conventional soft box 16. Bendable panels 10a-10e are substantially opaque thereby completely attenuating the light pattern in their specific regions. An exception to this is formed by the bent regions of bendable panels 10b-10e wherein a relatively small portion of light 21 is allowed to pass through, thereby providing the function of a conventional photographic "snoot". Panel 10f is formed from a fabric material that is translucent in opacity and thus provides a filtered light to the lower right portion 22 of the subject to be illuminated.

FIG. 7 shows a plurality of bendable panels 10g-10i which are disposed only over the upper portion of the front opening 15 of the soft box 16. Bendable panels 10g and 10i are substantially opaque thereby attenuating the light pattern to the upper left and right portions of the light pattern emanating from the soft box. Conversely, the lower portion of the front opening has no panels 10 releasably placed thereon so the lower portion 23 of the light pattern is allowed to radiate upon the lighted subject unimpeded. Bendable panel 10h on the other hand is formed from a translucent fabric which filters or modifies the upper central portion 24 of the soft box's light pattern.

FIG. 8 shows a plurality of bendable panels 10j-10m which are arranged to function in a manner similar to conventional photographic "barn doors". The bendable panels shown have a highly reflective rear surface in order to 'bounce' the side portions of the light pattern back to the central portion thereof. Although the panels 10j-10m are shown arranged on the side portions of the front opening 15, it is to be appreciated that the panels may also be arranged as "barn doors" on the top as well as bottom portions of the front opening 15 in order to bounce the emanating light downwards or upwards respectively. Alternatively, the present panel arrangement may also be realized using bendable panels having partially reflective, colored reflective, or even no reflective rear surface to further tailor the resulting light pattern to suit the user's needs. Additionally, two elongated sections of releasably attachable, manually shapeable tape 40 are shown in operational engagement on the soft box such that the outwardly extending portions of the bendable panels are maintained in their user selected orientation.

Figure 9:
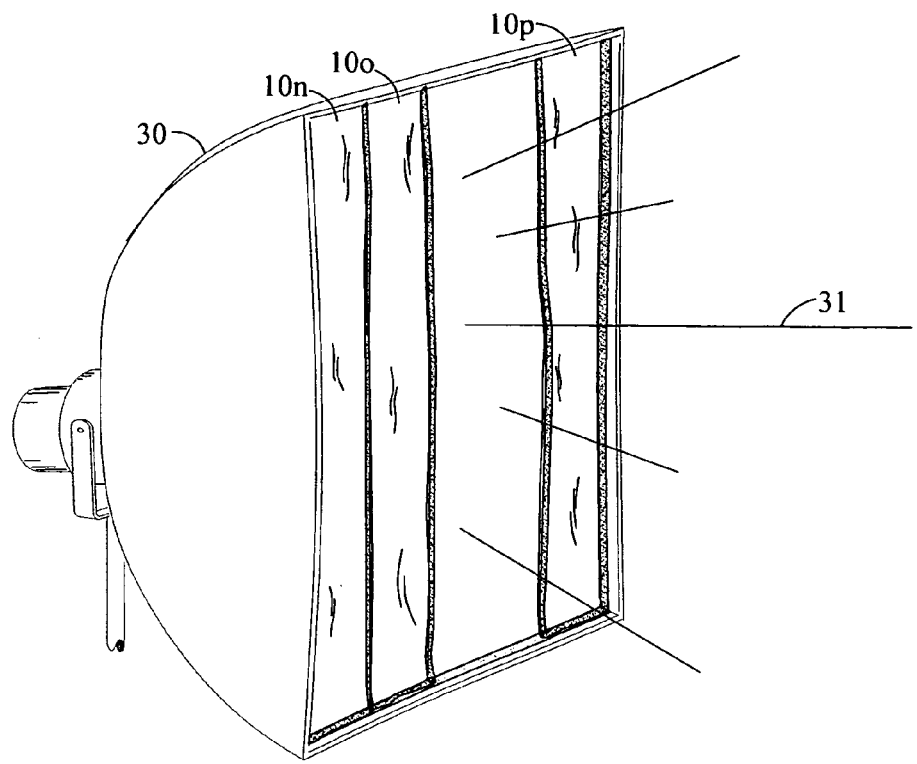
FIG. 9 is a perspective view of a plurality of the bendable panels of FIG. 1 shown in operational engagement over the front opening of a relatively large conventional photographic soft box, wherein the plurality of panels are optimally sized to form a one-by-five configuration.
Figure 10:
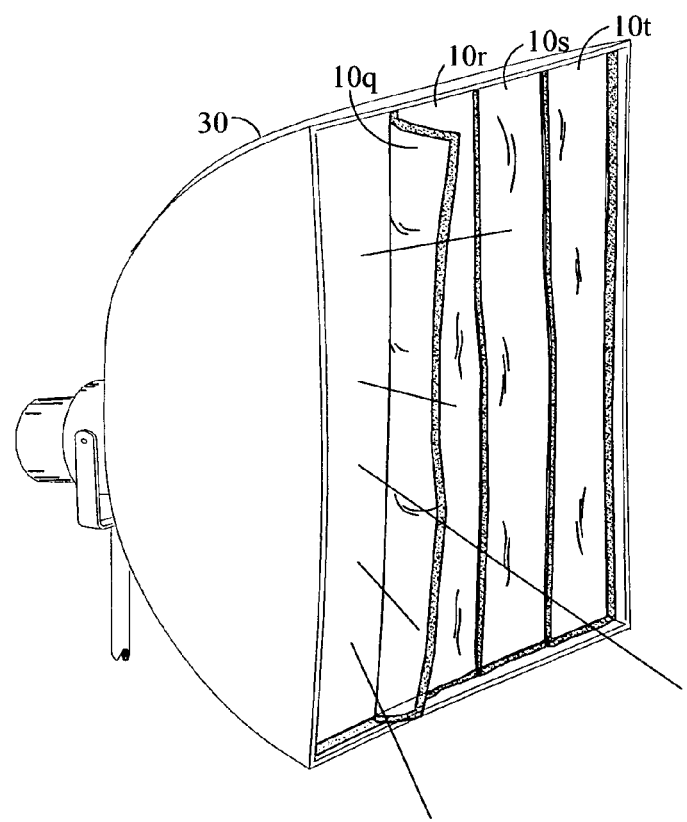
FIG. 10 is another perspective view of a plurality of the bendable panels of FIG. 1 shown in operational engagement over the front opening of the conventional photographic soft box of FIG. 9.

FIGS. 9 and 10 show several examples of the myriad of possible bendable panel arrangements utilizing a one-by-five modular configuration on a relatively large photographic soft box 30. FIG. 9 depicts an arrangement having three opaque panels 10n-10p partially covering the front opening of the soft box 30, thus allowing only a narrow, vertically oriented strip of light 31 to shine therefrom. FIG. 10 on the other hand, has four panels 10q-10t disposed over the front opening of the soft box 30, wherein panel 10q is bent outward in relation to the soft box thereby functioning as a "barn door".

Figure 11:
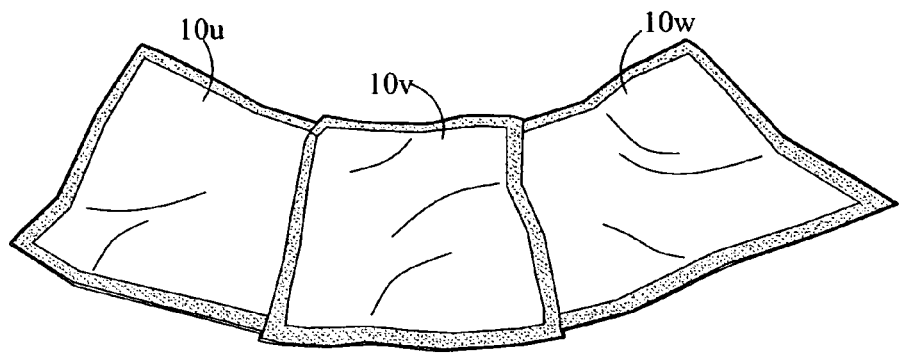
FIG. 11 is a perspective view of a plurality of the bendable panels of FIG. 1 shown arranged as a conventional photographic TRI-FLECTOR™.
Figure 12:
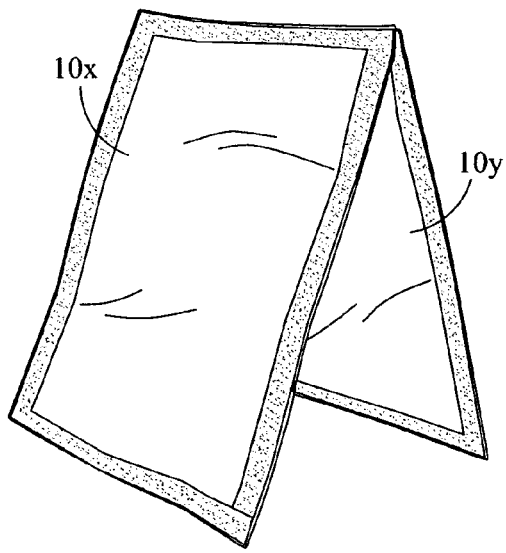
FIG. 12 is a perspective view of a plurality of the bendable panels of FIG. 1 arranged to form a free standing light reflective structure.
Figure 13:
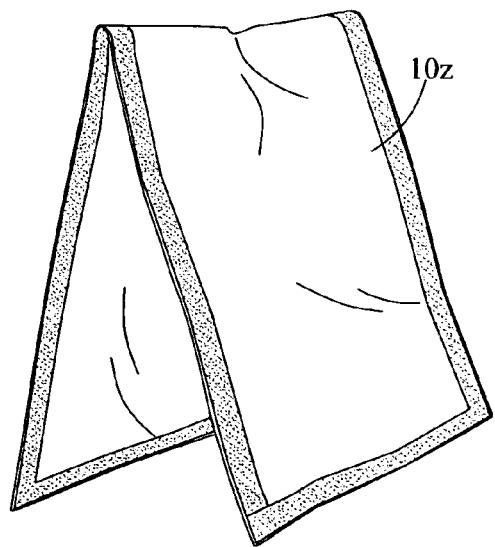
FIG. 13 is a perspective view of a bendable panel of FIG. 1 wherein said bendable panel has been bent proximate the mid-section thereof in order to form a free standing light reflective structure.

Although the modular filtering system of the present invention is ideally suited for use with photographic soft boxes, each bendable panel or any contiguously interconnected panel formed thereby may also have utility as a stand-alone device for reflection or refraction of virtually any type of light source. For example, FIG. 11 shows three contiguously interconnected panels 10u-10w which are obliquely bent at each of the interconnecting junctures thereof in order to form a conventional hand-held, photographic TRI-FLECTOR™. Another example is shown in FIG. 12 wherein two panels 10x-10y are interconnected at the upper-most edges thereof and pivotably oriented thereabout in order to allow for reasonably stable placement upon any flat surface. Yet another example is shown in FIG. 13 wherein an panel 10z having a relatively long height in relation to the width thereof, which is bent proximate the mid-section thereof in order to form a structure that is capable of reasonably stable placement upon any flat surface.

Figures 14, 15:
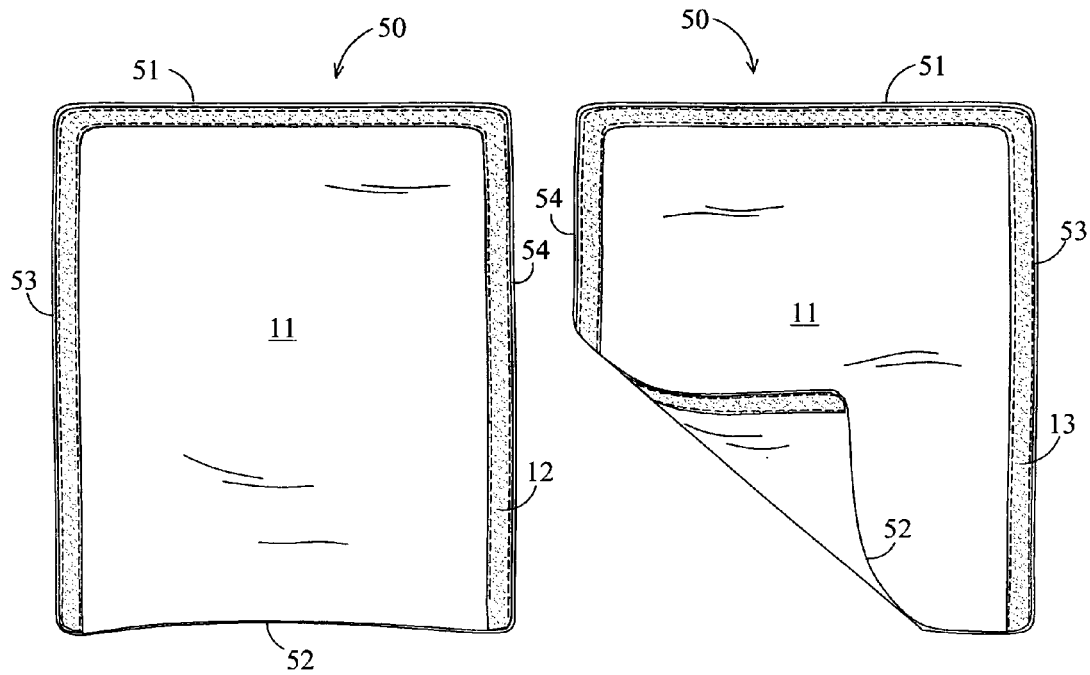
FIG. 14 is a front elevational view of an alternative embodiment according to the present invention.
FIG. 15 is a rear elevational view of the embodiment of FIG. 14 shown with a lower corner bent upwards to reveal a portion of the front surface thereof.
Figures 16, 17:
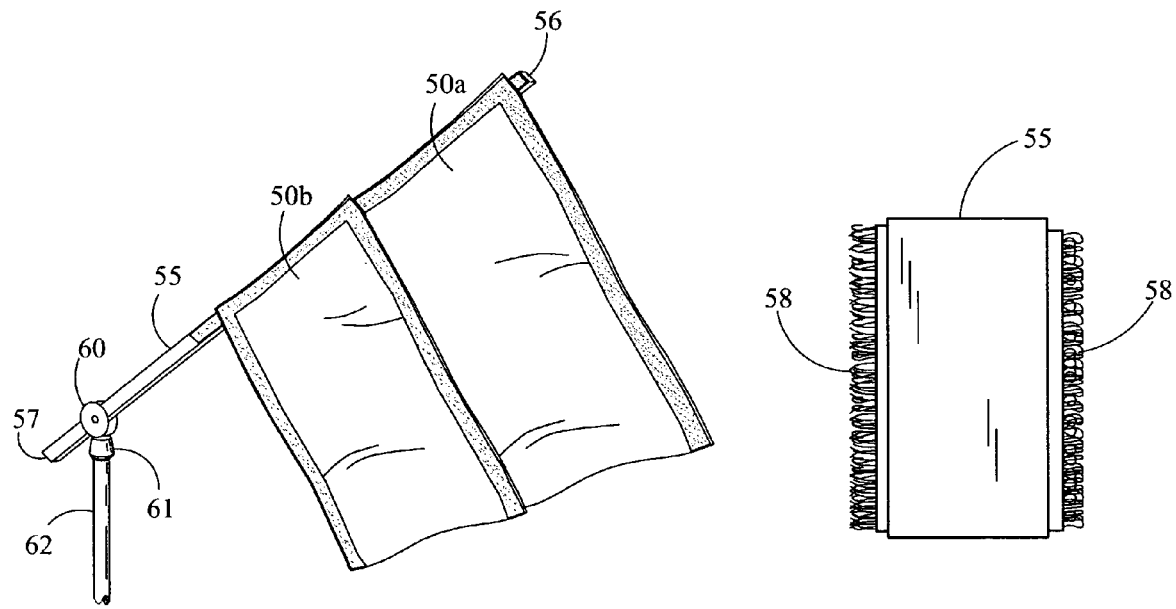
FIG. 16 is a perspective view of a plurality of the bendable panels of FIGS. 14, and shown in operational engagement on a pole in order to form a photographic flag.
FIG. 17 is an enlarged, top plan view of the pole of the embodiment of FIGS. 15, and 16 showing the arrangement of hook-and-loop fastening material thereon.

An alternative embodiment of the present invention is shown in FIGS. 14, through 17 in which a plurality of modular bendable panels 50 are adapted for use as photographic flags. The sheet of flexible material 11, edge stiffener (not shown), and fasteners (12, and 13) is similar in design and construction to the bendable panel 10 of FIGS. 1 through 3. However, the embodiment of FIGS. 1 through 3 in that the edge stiffener, and fastener is affixedly attached to only the upper 51, left 53, and right 54 edges of the generally rectangular-shaped sheet of flexible material 11. That is, the lower edge 52 has no edge stiffener, or fastener attached thereto.

A bendable panel support device defined by an elongated pole 55 having an upper end 56 and lower end 57 is included which has a fastener 58, preferably hook-and-loop fastening material, affixedly attached thereto which extends from the upper end 56 to a point intermediate the upper 56 and lower 57 end of the pole. Support for the pole 55 is accomplished via incorporation of a support bracket 60 which rotatingly interconnects the pole 55 to a tripod interconnect member 61. The tripod interconnect member preferably has a blind hole (not shown) which projects upwardly into member, wherein the hole is threaded in order to adaptably receive a common ¼ inch, 20 thread count bolt therein. Thus, the pole 55 may be easily configured for support at any orientation and position above the ground using commonly available photographic tripod equipment 62 or other similar device having a ¼ inch, 20 thread count bolt projecting thereabove.

FIG. 16 shows how the hook-and-loop fastening material is preferably disposed over the cross-sectional surface of the pole. Preferably, the pole has a generally rectangular cross-section; however, it will be appreciated by those skilled in the art that the pole may have virtually any cross-sectional shape or dimensional qualities that provides sufficient support for a plurality of bendable panels from the upper end portion of the pole in a cantilever fashion without bending or breaking.

Thus to use, at least one bendable panel 50a is releasably attached to the pole 55 proximate the upper end 56 thereof via pressing the upper edge, which contains hook-and-loop fastening material onto the complementary hook-and-loop fastening material onto the pole. It is to be understood that "complementary hook-and-loop fastening material" is defined as a relative term, which implies that when used in conjunction with another piece of hook-and-loop fastening material, incorporates that type of hook-and-loop material (hook side, or loop side) that will provide its intended releasable attachment function. For example, a hook-and-loop fastening material comprised of hook-type material would have a complementary hook-and-loop fastening material comprised of loop-type material, and vice-versa. The panel 50a is then bent to any desired shape and then supported from the lower end 57 in a cantilever fashion such that the panel lies within the emanating light pattern of any photographic light source as is typically done using conventional photographic flags. Nevertheless, additional panels 50b may also be releasably attached to the pole by repeating the aforedescribed procedure such that the panels (50a, and 50b) are contiguously interconnected as shown in FIG. 16.

Figure 18A:
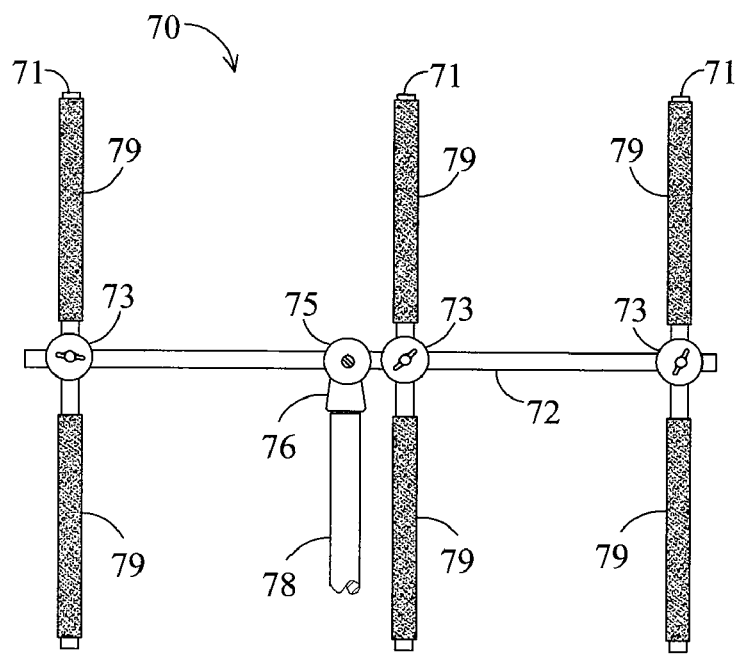
FIG. 18A is a front elevational view a bendable panel frame according to the present invention which is primarily adapted for releasable attachment of bendable panels thereon.

As hereinbefore stated, the bendable panels of the present invention are uniquely adapted for placement over the front opening of a conventional photographic soft box. Nevertheless, it is contemplated that other bendable panel support devices may be constructed in order to modify the light pattern of virtually any light source. FIG. 18A depicts one such device defining a bendable panel frame 70 is constructed of three vertically oriented struts 71, which are slidably attached to a generally horizontally oriented cross-member 72 via strut brackets 73. Support for the frame 70 is accomplished via incorporation of a main support bracket 75 which rotatingly interconnects the cross-member 72 to a tripod interconnect member 76, wherein the tripod interconnect member is described hereinabove. Thus, the frame 70 may be easily configured for support at any orientation and position above the ground using commonly available photographic tripod equipment 78 or other similar device having a ¼ inch, 20 thread count bolt projecting thereabove. Although the frame 70 is shown having three vertically oriented struts, it is to be understood that any number of struts may be realized using the teachings of the present invention such as one, two, four, or even five struts.

Figure 18B:
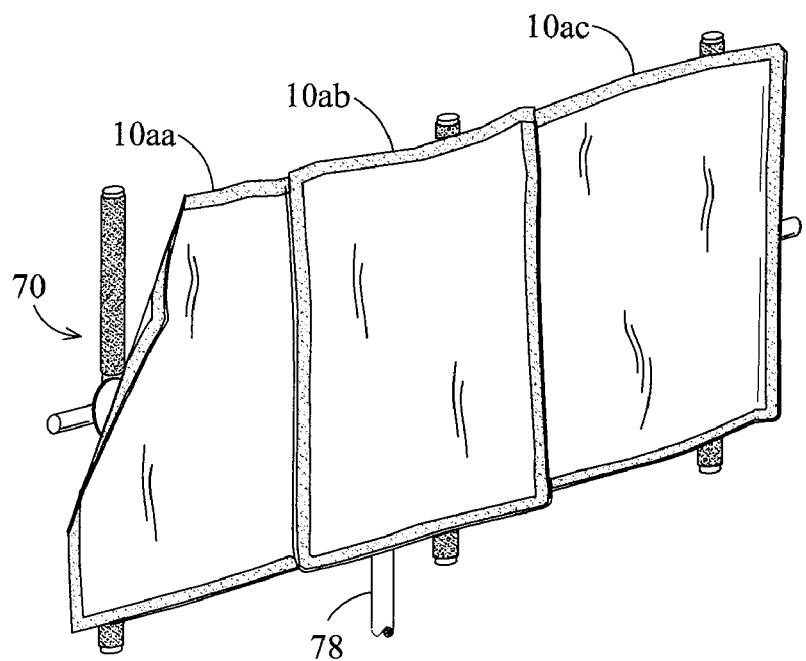
FIG. 18B is a perspective view of the embodiment of FIG. 18A having a plurality of contiguously aligned bendable panels in operational engagement thereon.
Figure 19:
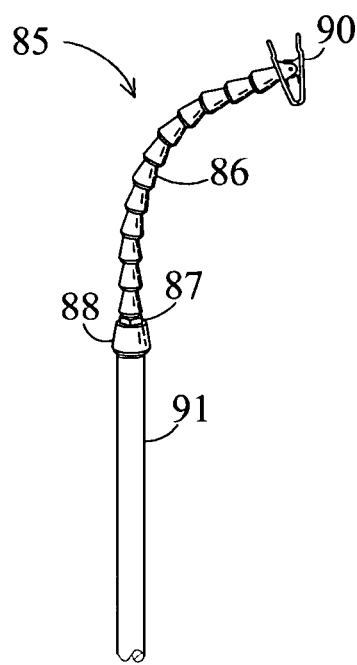
FIG. 19 is a side elevational view of a bendable panel support device according to the present invention.

Each of the three studs 71 has a layer of complimentary complementary fastener material 79 attached to the upper and lower portions thereof for releasable attachment of one or a plurality of bendable panels thereto. FIG. 18B shows three contiguously aligned bendable panels 10aa-10ac which are in operational engagement on the frame 70, wherein an upper corner of panel 10aa has been pulled slightly forward in order to create a unique light reflecting pattern upon a photographic subject. Nevertheless, it is to be appreciated that the panels may be shaped into a myriad of configurations while engaged upon the frame 70 in order to create virtually any resulting light pattern upon the photographic subject.

Another bendable panel support device 85 may comprise a elongated flexible member 86 that is capable of being formed into a plurality of varying shapes for support of the bendable panel 10 at a variety of orientations. Although it is well known in the art that there are several types of products suitable for this purpose, preferably the elongated flexible member 86 is of the type marketed by Lockwood Products, Inc. under the tradename LOC-LINE™. A terminating segment 87 of member 86 has a female threaded portion (not shown) depending therefrom which is screwingly inserted onto a stud (not shown) which is attached and projects upwardly from the tripod interconnect member 88. The tripod interconnect member preferably has a blind hole (not shown) which projects upwardly into member, wherein the hole is threaded in order to adaptably receive a common ¼ inch, 20 thread count bolt therein. Another terminating segment located at the opposing end of member 86 is attached to a spring-loaded clamp 90 using any well known attachment means such as gluement, weldment, or the like, wherein the clamp 90 is operable to enable selective attachment of a bendable panel 10 within its grasp.

Figure 20:
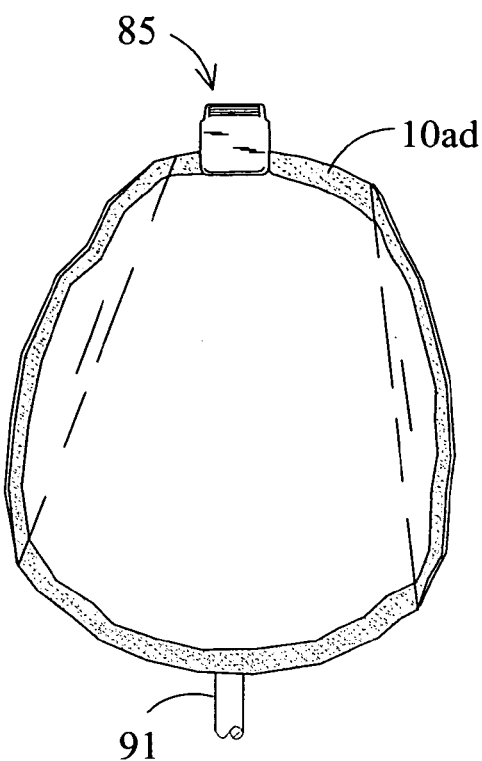
FIG. 20 is a front elevational view of the bendable panel support device of FIG. 19 having a circular shaped bendable panel in operational engagement thereon.

FIG. 20 shows a bendable panel 10ad, which has a generally circular outer peripheral shape, that is operable engagement on the support device 85 and is being supported above the ground via a conventional photographic tripod 91. As shown, both lateral portions of the bendable panel 10ad have been bent forward slightly and will remain in the shape as shown until bent into another shape by the user. The circular outer peripheral shape of bendable panel 10ad is well known in the photographic art and are commonly referred to as "dots".

Figure 21:
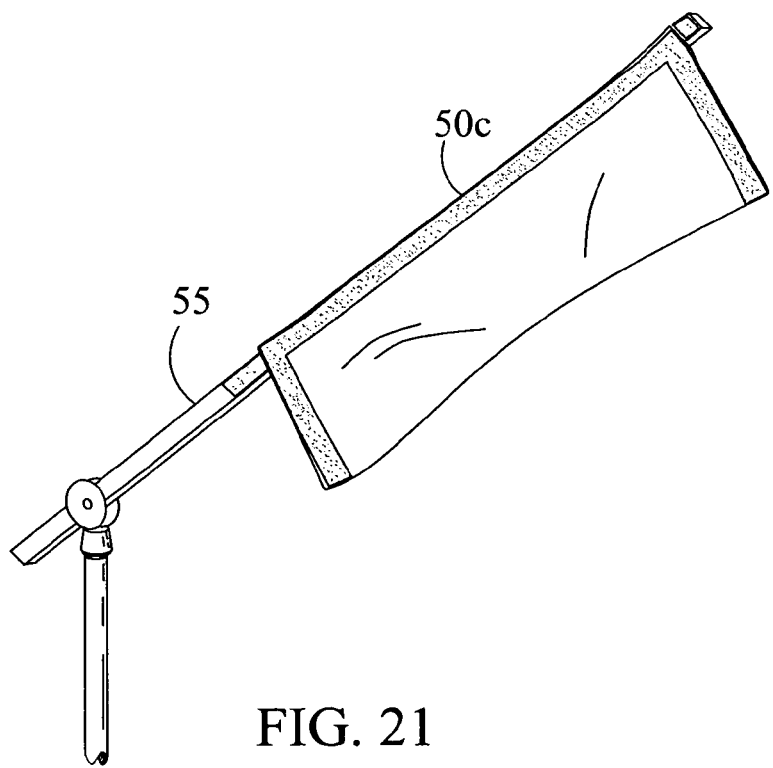
FIG. 21 is a perspective view of a flag that is in operational engagement upon a pole.

Yet another light refracting or reflecting tool that is commonly used by those in the photographic art is a "finger", wherein a finger is characterized by a flag having a width that is generally longer than the height thereof. FIG. 21 depicts a finger 50c that is releasably attached to rod 55. The sheet of flexible material 11, edge stiffener (not shown), and fastener members (12, and 13) of the finger 50c is similar in design and construction to the aforedescribed flag, the only difference being the outer peripheral shape, wherein the width being longer than the height thereof.

Thus, it can be easily seen that the system of the present invention may be used to highly customize the resulting light pattern from any light source and is particularly suitable for use on a conventional photographic soft box, the bendable panel frame 70, pole 55, or bendable panel support device 85.

Thus, the combination of bendable panels including photographic flags, dots, or fingers in conjunction with the bendable panel support devices (55, 70, 85) form a system for the manipulation of any light pattern in a myriad of ways under virtually any type of lighting condition. The system is inexpensive in design and capable of being stored in a compact manner thereby providing for ease of use at remote locations. Moreover, the present filtering system is highly versatile thus abating the need for multiple other prior art soft box light modification or filtering systems.

The present invention may be embodied in other specific forms without departing from the spirit or scope of the invention. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A modular filtering and reflective system for photographic use, said modular filtering system comprising a plurality of generally equal sized bendable panels, each of said bendable panels comprising:
   a sheet of flexible material having a front surface and a rear surface which is bounded by an outer periphery, said flexible material being adapted to modify the characteristics of visible light incident upon the front surface or the rear surface thereof;
   a fastener which is attached to the outer periphery of said sheet of flexible material, the fastener operable to be removably attached to a fastener of another one of the bendable panels; and,
   an edge stiffener which is fixedly attached to the outer periphery of said sheet of flexible material, wherein said edge stiffener is adapted to retain its shape, yet sufficiently pliable to be bent or formed by a user without excessive effort;
   wherein each of said plurality of bendable panels is adapted for contiguous placement over the front opening of a conventional photographic soft box; and,
   wherein each of said plurality of bendable panels has a predetermined height and width such that an integral quantity of bendable panels may essentially cover the front opening of said soft box.

2. The modular filtering and reflective system for photographic use of claim 1, wherein said edge stiffener is an elongated metallic strip having a generally rectangular cross-section.

3. The modular filtering and reflective system for photographic use of claim 1, wherein said fastener is made of hook-and-loop fastening material.

4. The modular filtering and reflective system for photographic use of claim 1, wherein he outer periphery of said sheet of flexible material is generally circular in shape.

5. The modular filtering and reflective system for photographic use of claim 1, wherein said edge stiffener is an elongated section of wire having a generally circular cross-section.

6. The modular filtering and reflective system for photographic use of claim 1, wherein said fastener is made of hook-and-loop fastening material.

7. The modular filtering and reflective system for photographic use of claim 1, wherein said flexible material is made of fabric.

8. The modular filtering and reflective system for photographic use of claim 1, wherein said flexible material is made of a sheet of aluminum.

9. The modular filtering and reflective system for photographic use of claim 1, wherein said sheet of flexible material is translucent in opacity.

10. The modular filtering and reflective system for photographic use of claim 1, wherein said sheet of flexible material is opaque in opacity.

11. The modular filtering and reflective system for photographic use of claim 10, wherein either the front surface or rear surface is at least partially reflective to incidental light.

12. A modular filtering and reflective system for photographic use, said modular filtering system comprising:
   a plurality of generally equal sized bendable panels, each of said bendable panels comprising:
      a sheet of flexible material having a front surface and a rear surface which is bounded by an outer periphery, said flexible material being adapted to modify the characteristics of visible light incident upon the front surface or the rear surface thereof;
      a fastener which is attached to the outer periphery of said sheet of flexible material;
      an edge stiffener which is attached to the outer periphery of said sheet of flexible material, wherein said edge stiffener is adapted to retain its shape, yet sufficiently pliable to be bent or formed by a user without excessive effort;
      wherein each of said plurality of bendable panels is adapted for contiguous placement over the front opening of a conventional photographic soft box; and,
      wherein each of said plurality of bendable panels has a predetermined height and width such that an integral quantity of bendable panels may essentially cover the front opening of said soft box; and
   a substantially elongated section of manually shapeable tape, said manually shapeable tape comprising:
      a substantially elongated section of the hook side of a conventional hook-and-loop fastening material having two first outer edges defining the first width thereof;
      a substantially elongated section of the loop side of a conventional hook-and-loop fastening material having two second outer edges defining the second width thereof; and,
      a edge stiffener having a predetermined cross-sectional shape and a substantially elongated length, said edge stiffener being adapted to retain its shape, yet sufficiently pliable to be bent or formed by a user without excessive effort;
      wherein said first width is essentially equal to said second width, the first two outer edges of said hook side are affixedly attached to the two second outer edges of said loop side such that said edge stiffener is sandwiched therebetween.

* * * * *